(12) United States Patent
Peng et al.

(10) Patent No.: US 11,290,871 B2
(45) Date of Patent: Mar. 29, 2022

(54) TRACKING AREA UPDATE METHODS AND DEVICES

(71) Applicant: HUAWEI TECHNOLOGIES CO., LTD., Guangdong (CN)

(72) Inventors: Wenjie Peng, Shanghai (CN);
Mingzeng Dai, Shanghai (CN);
Hongzhuo Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 71 days.

(21) Appl. No.: 16/521,354

(22) Filed: Jul. 24, 2019

(65) Prior Publication Data
US 2019/0349749 A1    Nov. 14, 2019

Related U.S. Application Data

(63) Continuation of application No. PCT/CN2018/073630, filed on Jan. 22, 2018.

(30) Foreign Application Priority Data

Jan. 25, 2017    (CN) .......................... 201710061266.0

(51) Int. Cl.
*H04W 4/00* (2018.01)
*H04W 8/24* (2009.01)
(Continued)

(52) U.S. Cl.
CPC .............. *H04W 8/24* (2013.01); *H04W 68/02* (2013.01); *H04W 88/06* (2013.01)

(58) Field of Classification Search
None
See application file for complete search history.

(56) References Cited

U.S. PATENT DOCUMENTS

| 2009/0201842 A1 | 8/2009 | Guan |
| 2010/0113015 A1 | 5/2010 | Casati et al. |

(Continued)

FOREIGN PATENT DOCUMENTS

| CN | 1832623 A | 9/2006 |
| CN | 1864419 A | 11/2006 |

(Continued)

OTHER PUBLICATIONS

Ericsson, CATT, Huawei, "Tracking Area Update procedure with MME and Serving GW change," 3GPP TSG SA WG2 Architecture S2#58, S2-072946, Orlando, FL, USA, Jun. 25-29, 2007, 5 pages.

(Continued)

*Primary Examiner* — Gerald A Smarth
(74) *Attorney, Agent, or Firm* — Fish & Richardson P.C.

(57) ABSTRACT

Example communications methods and systems are described. One example communications system includes a base station supporting connectivity to a core network of the first communications standard and a core network of the second communications standard. One example method includes that a terminal receives information broadcast by the base station. The information includes a first and a second area identities. When the terminal enters a cell served by the base station from a cell of the second communications standard and when the second area identity does not belong to a current area list of the terminal, the terminal initiates an area update to the core network of the second communications standard. The base station broadcasts the area identities of the two communications standards.

9 Claims, 10 Drawing Sheets

(51) Int. Cl.
  *H04W 68/02* (2009.01)
  *H04W 88/06* (2009.01)

(56) References Cited

U.S. PATENT DOCUMENTS

| | | | | |
|---|---|---|---|---|
| 2012/0094673 A1* | 4/2012 | Sebire | ............ | H04W 36/00837 455/436 |
| 2013/0272242 A1 | 10/2013 | Sennett et al. | | |
| 2014/0038620 A1 | 2/2014 | Hedberg et al. | | |
| 2015/0045025 A1* | 2/2015 | Lim | ................ | H04W 36/00837 455/434 |
| 2015/0271868 A1* | 9/2015 | Rune | ..................... | H04W 24/08 370/311 |
| 2015/0358887 A1* | 12/2015 | Xu | .................... | H04W 36/0055 455/436 |
| 2016/0080979 A1 | 3/2016 | Jin et al. | | |
| 2016/0119824 A1 | 4/2016 | Jin et al. | | |
| 2016/0345243 A1* | 11/2016 | Zaus | ..................... | H04W 36/08 |
| 2017/0064601 A1* | 3/2017 | Kubota | ................. | H04W 74/00 |
| 2017/0201912 A1* | 7/2017 | Zingler | ................ | H04W 36/08 |
| 2018/0184246 A1* | 6/2018 | Ryu | ....................... | H04W 68/06 |
| 2018/0368101 A1* | 12/2018 | Agiwal | ................ | H04W 68/02 |

FOREIGN PATENT DOCUMENTS

| | | |
|---|---|---|
| CN | 1934891 A | 3/2007 |
| CN | 101166357 A | 4/2008 |
| CN | 101217746 A | 7/2008 |
| CN | 101217812 A | 7/2008 |
| CN | 101742676 A | 6/2010 |
| CN | 101822100 A | 9/2010 |
| CN | 103428668 A | 12/2013 |
| CN | 102342133 B | 4/2014 |
| CN | 103974231 A | 8/2014 |
| CN | 104322095 A | 1/2015 |
| CN | 105764047 A | 7/2016 |
| CN | 105939525 A | 9/2016 |
| CN | 102640548 B | 10/2016 |
| EP | 2514251 B1 | 8/2016 |
| RU | 2009133374 A | 3/2011 |
| WO | 0237884 A1 | 5/2002 |
| WO | 2014014324 A1 | 1/2014 |
| WO | 2014098338 A1 | 6/2014 |
| WO | 2016208997 A1 | 12/2016 |

OTHER PUBLICATIONS

Ericsson, "Tight NR/LTE interworking and stand-alone NR access," 3GPP TSG-RAN WG2 #94, R2-164007, Nanjing, P.R. China, May 23-27, 2016, 4 pages.
Huawei, "Correction on NB-IoT RAT Type," 3GPP TSG-RAN3 Meeting #92, R3-161165, Nanjing, China, May 23-27, 2016, 3 pages.
Huawei, Inter-system mobility cases, 3GPP TSG-RAN WG3 AH, R3-170229, Spokane, Washington, USA, Jan. 17-19, 2017, 5 pages.
Huawei, "NR location area management," 3GPP TSG-RAN WG3 Meeting #93, R3-161758, Gothenburg, Sweden, Aug. 22-26, 2016, 3 pages.
Intel Corporation, "Mobility support for lightly connected UE," 3GPP TSG RAN WG2 Meeting #95, R2-164987, Gothenburg, Sweden, Aug. 22-26, 2016, 5 pages.
Office Action issued in Japanese Application No. 2019-560445 dated Oct. 5, 2020, 9 pages (with English translation).
Ericsson, "Tracking Area Concept", 3GPP TSG RAN WG3 Meeting #55, R3-070143, St Louis, US, Feb. 12-16, 2007, 5 pages.
3GPP TS 36.300 V14.1.0 (Dec. 2016),3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2(Release 14), Dec. 2016, 317 pages.
3GPP TS 36.413 V14.1.0 (Jan. 2017), 3rd Generation Partnership Project, Technical Specification Group Radio Access Network, Evolved Universal Terrestrial Radio Access Network(E-UTRAN), S1 Application Protocol (S1 AP)(Release 14), Jan. 2017, 333 pages.
3GPP TS 23.401 V14.2.0 (Dec. 2016), 3rd Generation Partnership Project, Technical Specification Group Services and System Aspects, General Packet Radio Service (GPRS) enhancements for Evolved Universal Terrestrial Radio Access Network (E-UTRAN) access(Release 14), Dec. 2016, 385 pages.
3GPP TS 24.301 V14.2.0 (Dec. 2016), 3rd Generation Partnership Project, Technical Specification Group Core Network and Terminals, Non-Access-Stratum (NAS) protocol for Evolved Packet System (EPS), Stage 3(Release 14),dated Dec. 16, 2016, 470 pages.
3GPP TS 36.331 V14.1.0 (Dec. 2016),3rd Generation Partnership Project;Technical Specification Group Radio Access Network, Evolved Universal Terrestrial Radio Access (E-UTRA),Radio Resource Control (RRC), Protocol specification (Release 14), Dec. 2016, 653 pages.
3GPP TS 23.502 V0.0.0 (Jan. 2017), 3rd Generation Partnership Project, Technical Specification Group Services and System Aspects, Procedures for the 5G System, Stage 2, (Release 15), 13 pages.
3GPP TS 23.501 V0.0.0 (Jan. 2017), 3rd Generation Partnership Project, Technical Specification Group Services and System Aspects, System Architecture for the 5G System, Stage 2, (Release 15), 14 pages.
Intel Corporation, "Capture NR agreements into 36.331 for E-UTRA connected to 5GC", 3GPP TSG-RAN2 Meeting #103, R2-1813139, Gothenburg, Sweden, Aug. 20-24, 2018, 137 pages.
3GPP TS 36.321 V14.1.0 (Dec. 2016),3rd Generation Partnership Project, Technical Specification Group Radio Access Network, Evolved Universal Terrestrial Radio Access (E-UTRA), Medium Access Control (MAC) protocol specification (Release 14), 98 pages.
Extended European Search Report issued in European Application No. 18744831.1, dated Nov. 22, 2019, 12 pages.
PCT International Search Report and Written Opinion in International Application No. PCT/CN2018/073,630, dated Mar. 23, 2018, 16 pages (With English Translation).
Office Action issued in Chinese Application No. 201710061266.0 dated Mar. 2, 2020, 26 pages (With English Translation).
CATT, "Discussion on RAN-CN Functional Split in 5G NR," 3GPP TSG RAN3 #91bis, R3-160782, Bangalore, India, Apr. 11-15, 2016, 6 pages.
Huawei, "LTE-NR interface functions and procedures," 3GPP TSG-RAN WG3 Meeting #93, R3-161755, Gothenburg, Sweden, Aug. 22-26, 2016, 6 pages.
Office Action issued in Chinese Application No. 201710061266.0 dated Nov. 12, 2020, 9 pages (with English translation).
3GPP TS 23.003 V13.8.0 (Dec. 2016), "3rd Generation Partnership Project; Technical Specification Group Core Network and Terminals; Numbering, addressing and identification(Release 13)," Dec. 2016, 103 pages.
Office Action issued in Japanese Application No. 2019-560445 dated Jun. 28, 2021, 7 pages (with English translation).
Office Action issued in Russian Application No. 2019126658/07(052272) dated Apr. 22, 2021, 31 pages (machine English translation).

\* cited by examiner

TRACKING AREA UPDATE METHODS AND DEVICES

CROSS-REFERENCE TO RELATED APPLICATIONS

This application is a continuation of International Application No. PCT/CN2018/073630, filed on Jan. 22, 2018, which claims priority to Chinese Patent Application No. 201710061266.0, filed on Jan. 25, 2017. The disclosures of the aforementioned applications are hereby incorporated by reference in their entireties.

TECHNICAL FIELD

Embodiments of this application relate to communications technologies, and in particular, to a communication method and a communications device.

BACKGROUND

As wireless communications technologies develop, wireless networks are increasingly popular, and people impose increasingly high requirements for performance of the wireless networks. Therefore, the wireless networks are constantly evolving to improve their performance. As the wireless networks evolve, communication of a terminal tends to be less reliable when the terminal moves between networks of old and new standards.

SUMMARY

Embodiments of this application provide a communication method and a communications device, to improve communication reliability for a terminal.

According to a first aspect, this application provides a communication method, where a communications system supporting a first communications standard and a second communications standard includes a base station connected to a core network of the first communications standard and a core network of the second communications standard, and the method includes: broadcasting, by the base station, a first area identity, where the first area identity is an area identity used, in the first communications standard, for location management for a terminal; when a terminal enters a cell served by the base station, receiving, by the terminal, information broadcast by the base station; and if the terminal supports the first communications standard and the second communications standard, when the terminal enters the cell served by the base station from a cell of the first communications standard, broadcasting, by the base station, a second area identity, where the second area identity is an area identity used, in the second communications standard, for location management for a terminal, and initiating, by the terminal, an area update to the core network of the second communications standard; or when the terminal enters the cell served by the base station from a cell of the second communications standard, broadcasting, by the base station, a second area identity, where the second area identity is not in a current area list of the terminal, and initiating, by the terminal, an area update to the core network of the second communications standard.

The first communications standard may be 4G, and the second communications standard may be 5G.

In a possible design, the method further includes: sending, by the terminal, a first indication information element to the base station, where the first indication information element is used to indicate that the area update initiated by the terminal is initiated to the core network of the second communications standard.

In a possible design, the method further includes: before the terminal initiates an area update to the core network of the second communications standard, sending, by the terminal, capability information of the terminal to the base station, where if the capability information indicates that the terminal supports the second communications standard, the terminal does not need to send the first indication information element to the base station.

In a possible design, when the terminal enters the cell served by the base station from a cell of the second communications standard, the method further includes: initiating, by the terminal, an area update to the core network of the first communications standard.

In a possible design, the method further includes: sending, by the terminal, a second indication information element to the base station, where the second indication information element is used to indicate that the area update initiated by the terminal is initiated to the core network of the first communications standard.

In a possible design, a format of the first area identity is different from that of the second area identity.

In a possible design, the first area identity is a tracking area code TAC, and the second area identity is a paging area code PAC.

In a possible design, a format of the first area identity is the same as that of the second area identity, and the method further includes:

receiving, by the terminal, first indication information and second indication information, where the first indication information is used to indicate that the first area identity is used for the first communications standard, and the second indication information is used to indicate that the second area identity is used for the second communications standard; or receiving, by the terminal, indication information, where the indication information is used to indicate that the first area identity is used for the first communications standard, and that the second area identity is used for the second communications standard by default; or receiving, by the terminal, indication information, where the indication information is used to indicate that the second area identity is used for the second communications standard, and that the first area identity is used for the first communications standard by default.

According to a second aspect, this application provides a communication method, where a communications system supporting a first communications standard and a second communications standard includes a base station supporting connectivity to a core network of the first communications standard and a core network of the second communications standard, and the method includes: broadcasting, by the base station, a first area identity and a second area identity, where the first area identity is used to identify an area used, in the first communications standard, for location management for a terminal, and the second area identity is used to identify an area used, in the second communications standard, for location management for a terminal; when a terminal enters a cell served by the base station from a cell of the first communications standard, or when a terminal enters a cell served by the base station from a cell of the second communications standard and the second area identity does not belong to a current area list of the terminal, receiving, by the base station, a first area update request sent by the terminal;

and sending, by the base station, the first area update request to the core network of the second communications standard.

In a possible design, the method further includes:
receiving, by the base station, a first indication information element sent by the terminal, where the first indication information element is used to indicate that the area update initiated by the terminal is initiated to the core network of the second communications standard; and the sending, by the base station, the first area update request to the core network of the second communications standard includes:
sending, by the base station, the first area update request to the core network of the second communications standard according to the first indication information element.

In a possible design, when the terminal enters the cell served by the base station from a cell of the second communications standard, the method further includes:
receiving, by the base station, a second area update request initiated by the terminal to the core network of the first communications standard; and
sending, by the base station, the second area update request to the core network of the first communications standard.

In a possible design, the method further includes: receiving, by the base station, a second indication information element sent by the terminal, where the second indication information element is used to indicate that the area update initiated by the terminal is initiated to the core network of the first communications standard; and the sending, by the base station, the second area update request to the core network of the first communications standard includes:
sending, by the base station, the second area update request to the core network of the first communications standard according to the second indication information element.

In a possible design, a format of the first area identity is different from that of the second area identity.

In a possible design, the first area identity is a tracking area code TAC, and the second area identity is a paging area code PAC.

In a possible design, a format of the first area identity is the same as that of the second area identity, and the method further includes:
sending, by the base station, first indication information and second indication information to the terminal, where the first indication information is used to indicate that the first area identity is used for the first communications standard, and the second indication information is used to indicate that the second area identity is used for the second communications standard; or
sending, by the base station, indication information to the terminal, where the indication information is used to indicate that the first area identity is used for the first communications standard, and that the second area identity is used for the second communications standard by default; or
sending, by the base station, indication information to the terminal, where the indication information is used to indicate that the second area identity is used for the second communications standard, and that the first area identity is used for the first communications standard by default.

According to a third aspect, this application provides a communications device, applied to a communications system supporting a first communications standard and a second communications standard, where the communications system further includes a base station supporting connectivity to a core network of the first communications standard and a core network of the second communications standard, information broadcast by the base station includes a first area identity, and the first area identity is used to identify an area used, in the first communications standard, for location management for a terminal, where the terminal supports the first communications standard and the second communications standard; and the device is located in a terminal and includes:
a receiving unit, configured to receive the information broadcast by the base station; and
a processing unit, configured to: when the terminal enters a cell served by the base station from a cell of the first communications standard, and the information broadcast by the base station includes a second area identity, initiate an area update to the core network of the second communications standard, where the second area identity is used to identify an area used, in the second communications standard, for location management for a terminal; or
when the terminal enters a cell served by the base station from a cell of the second communications standard, and the information broadcast by the base station includes a second area identity that does not belong to a current area list of the terminal, initiate an area update to the core network of the second communications standard, where the second area identity is used to identify an area used, in the second communications standard, for location management for a terminal.

In a possible design, the processing unit is further configured to send a first indication information element to the base station, where the first indication information element is used to indicate that the area update initiated by the processing unit is initiated to the core network of the second communications standard.

In a possible design, when the terminal enters the cell served by the base station from a cell of the second communications standard, the processing unit is further configured to initiate an area update to the core network of the first communications standard.

In a possible design, the processing unit is further configured to send a second indication information element to the base station, where the second indication information element is used to indicate that the area update initiated by the processing unit is initiated to the core network of the first communications standard.

In a possible design, a format of the first area identity is different from that of the second area identity.

In a possible design, a format of the first area identity is the same as that of the second area identity, and the processing unit is further configured to:
receive first indication information and second indication information, where the first indication information is used to indicate that the first area identity is used for the first communications standard, and the second indication information is used to indicate that the second area identity is used for the second communications standard; or
receive indication information, where the indication information is used to indicate that the first area identity is used for the first communications standard, and that the second area identity is used for the second communications standard by default; or
receive indication information, where the indication information is used to indicate that the second area identity is used for the second communications standard, and that the first area identity is used for the first communications standard by default.

According to a fourth aspect, this application provides a communications device, applied to a communications system supporting a first communications standard and a second communications standard, where the communications system includes a base station supporting connectivity to a core network of the first communications standard and a core network of the second communications standard; and the device is located in the base station and includes:

a first sending unit, configured to broadcast a first area identity and a second area identity, where the first area identity is used to identify an area used, in the first communications standard, for location management for a terminal, and the second area identity is used to identify an area used, in the second communications standard, for location management for a terminal;

a receiving unit, configured to: when a terminal enters a cell served by the base station from a cell of the first communications standard, or when a terminal enters a cell served by the base station from a cell of the second communications standard and the second area identity does not belong to a current area list of the terminal, receive a first area update request sent by the terminal; and a second sending unit, configured to send the first area update request to the core network of the second communications standard.

In a possible design, the receiving unit is further configured to receive a first indication information element sent by the terminal, where the first indication information element is used to indicate that the area update initiated by the terminal is initiated to the core network of the second communications standard, and the second sending unit is configured to send the first area update request to the core network of the second communications standard according to the first indication information element.

In a possible design, the receiving unit is further configured to: when the terminal enters the cell served by the base station from a cell of the second communications standard, receive a second area update request initiated by the terminal to the core network of the first communications standard, and the second sending unit is further configured to send the second area update request to the core network of the first communications standard.

In a possible design, the receiving unit is further configured to receive a second indication information element sent by the terminal, where the second indication information element is used to indicate that the area update initiated by the terminal is initiated to the core network of the first communications standard, and the second sending unit is configured to send the second area update request to the core network of the first communications standard according to the second indication information element.

In a possible design, a format of the first area identity is different from that of the second area identity.

In a possible design, a format of the first area identity is the same as that of the second area identity, and the first sending unit is further configured to:

send first indication information and second indication information to the terminal, where the first indication information is used to indicate that the first area identity is used for the first communications standard, and the second indication information is used to indicate that the second area identity is used for the second communications standard; or send indication information to the terminal, where the indication information is used to indicate that the first area identity is used for the first communications standard, and that the second area identity is used for the second communications standard by default; or send indication information to the terminal, where the indication information is used to indicate that the second area identity is used for the second communications stan-dard, and that the first area identity is used for the first communications standard by default.

According to a fifth aspect, this application provides a computer program. When executed by a processor, the program is used to perform the method in the first aspect.

According to a sixth aspect, this application provides a computer program. When executed by a processor, the program is used to perform the method in the second aspect.

According to a seventh aspect, a program product is provided, where the program product is, for example, a computer readable storage medium and includes the program in the fifth aspect.

According to an eighth aspect, a program product is provided, where the program product is, for example, a computer readable storage medium and includes the program in the sixth aspect.

It can be learned that in the foregoing aspects, the base station supporting connectivity to the core network of the first communications standard and the core network of the second communications standard broadcasts the first area identity and the second area identity for the two communications standards. Therefore, when entering the cell served by the base station, a terminal supporting the two communications standards can receive the two area identities, and perform area updating based on the second area identity, for timely access to the communications system of the second communications standard or timely area updating. This reduces a failure probability of terminal paging, thereby improving communication reliability for the terminal.

DESCRIPTION OF EMBODIMENTS

The embodiments of this application are applied to a communications system supporting two different communications standards. Communications systems of different communications standards use different radio access technologies (RAT). The two different communications standards are differentiated by using a first communications standard and a second communications standard. The first communications standard uses a first RAT, and the first RAT is, for example, long term evolution (LTE), that is, the first communications standard is 4G. The second communications standard uses a second RAT, and the second RAT is, for example, a new radio access technology (NR), that is, the second communications standard is 5G. A 4G communications system or a 5G communications system includes a base station and a core network. In the following, some terms in this application are described, to facilitate understanding of a person skilled in the art.

(1) A terminal, also referred to as user equipment (UE), is a device that provides voice and/or data connectivity for a user, for example, a handheld device or an in-vehicle device having a wireless connection function. Common terminals include, for example, mobile phones, tablet computers, notebook computers, palmtop computers, mobile internet devices (MID), and wearable devices such as smartwatches, smart bands, and pedometers.

(2) A base station, also referred to as a radio access network (RAN) device, is a device that connects a terminal to a wireless network, including abase station of each communications standard, for example, including but not limited to: a transmission reception point (TRP), an evolved NodeB (eNB), a radio network controller (RNC), a NodeB (NB), a base station controller (BSC), a base transceiver station (BTS), a home base station (for example, Home evolved NodeB or Home Node B, HNB), or a baseband unit (BBU). In addition, the device may include a Wi-Fi access point (AP), or the like.

In the embodiments, base stations in communications systems of different communications standards are different. For differentiation, a base station in the 4G communications system is referred to as an LTE eNB, a base station in the 5G communications system is referred to as an NR gNB, and a base station supporting both the 4G communications system and the 5G communications system is referred to as an eLTE eNB. These names are merely for ease of differentiation and do not impose any limitation.

(3) "A plurality of" means two or more. Other quantifiers are similar to that. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects.

Figure 1:
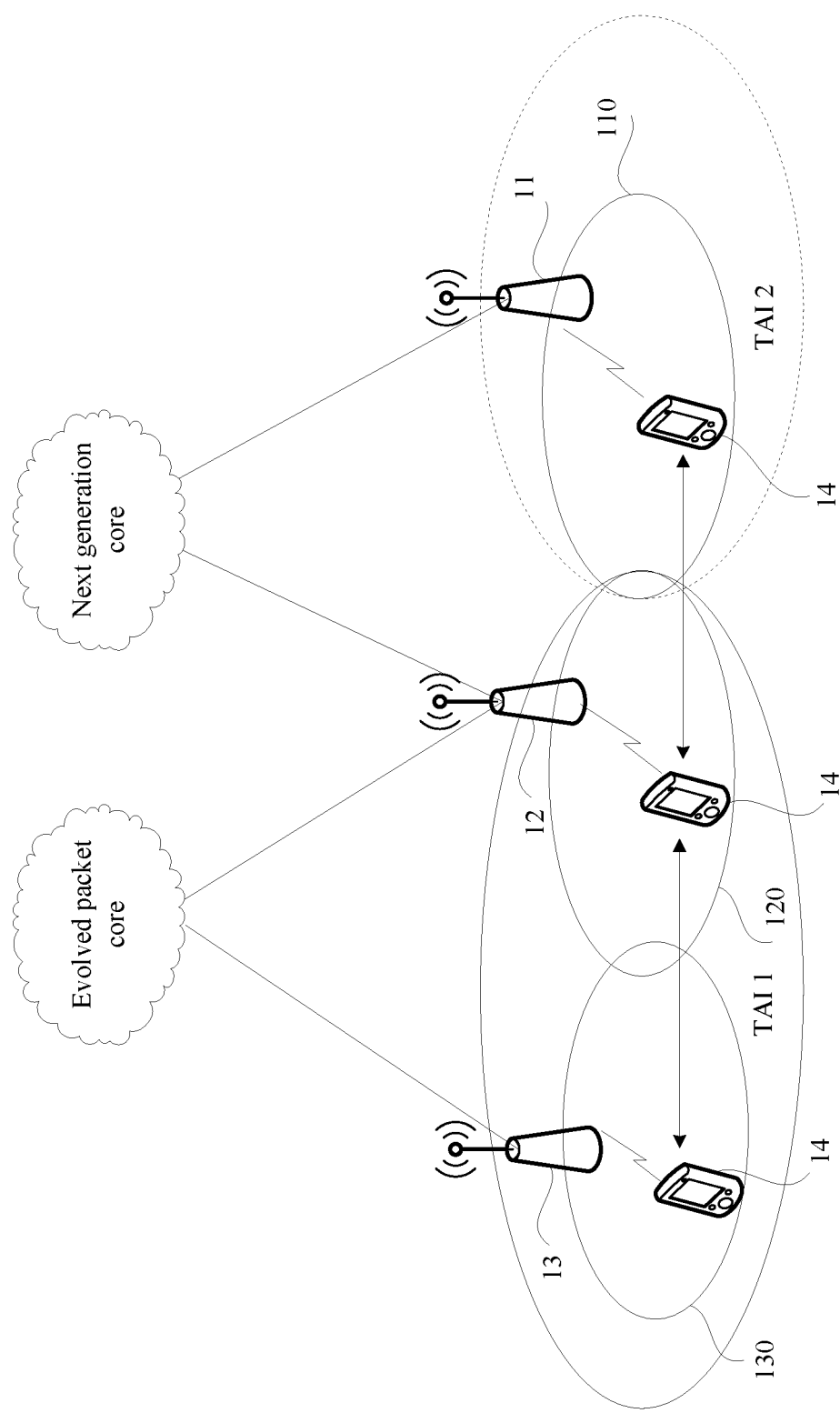
FIG. 1 is a schematic diagram of a scenario according to an embodiment of this application.

FIG. 1 is a schematic diagram of a communication scenario according to an embodiment of this application. As shown in FIG. 1, a 5G communications system includes a next generation core (NGC) and a radio access network (RAN) connected to the NGC, and the RAN connected to the NGC includes an NR gNB 11 and an eNB 12. A 4G communications system includes an evolved packet core (EPC) and a RAN connected to the EPC, and the RAN connected to the EPC includes an eNB 13 and an eNB 12. The eNB 13 supports connectivity to the EPC but not connectivity to the NGC. The eNB 12 supports connectivity to both the EPC and the NGC. In this embodiment, to distinguish between the eNB 13 and the eNB 12, the eNB 13 may be referred to as an LTE eNB, and the eNB 12 may be referred to as an eLTE eNB. In communication networking, the LTE eNB may be upgraded to an eLTE eNB that can be connected to the NGC.

As shown in FIG. 1, 110 represents a cell served by the NR gNB 11, 120 represents a cell served by the eNB 12, and 130 represents a cell served by the eNB 13. To enable location management for a terminal, a concept of area is introduced, for example, a tracking area (TA) in an LTE system. The eNB 12 broadcasts a tracking area code (TAC) and a public land mobile network identity (PLMN ID) that are of a tracking area in which the cell served by the eNB 12 is located. The TAC and the PLMN ID form a tracking area identity (TAI). A TAC (or TAI) is used to identify an area used, in a communications system, for location management for a terminal. Currently, a tracking area update (TAU) mechanism in the LTE system is as follows: A terminal moves in idle mode; and if a tracking area identity (TAI) of a cell that the terminal currently enters is in a TAI list of the terminal, the terminal triggers no TAU, or if a TAI of a cell that the terminal currently enters is not in a TAI list of the terminal, the terminal triggers a TAU.

A TAI of a TA in which the cell 120 is located may use a TAI in the 4G communications system, and therefore TA planning of the existing 4G communications system is not affected. If the existing TAU mechanism is used, when a terminal moves to the cell 120, usually, no TAU is initiated because the cell 110 and the cell 120 are planned in a same TA or a same TA list, or because the cell 120 and the cell 130 are planned in a same TA or a same TA list. Consequently, communication of the terminal is not reliable enough.

For example, a terminal 14 supports both the 4G communications system and the 5G communications system; and when the terminal 14 moves in idle mode from the cell 130 to the cell 120, the terminal 14 initiates no TAU because the cell 130 and the cell 120 are planned in a same TA. In this case, the terminal 14 cannot access the NGC and therefore cannot obtain services of the 5G network. For another example, it is assumed that the terminal 14 is registered with the NGC, and that a TAI list configured by the NGC for the terminal 14 includes both a TAI of a TA in which a cell served by an eLTE eNB is located and a TAI of a TA in which a cell served by an NR gNB is located. For example, a TAI list configured by the NGC for the terminal 14 includes a TAI 1 of a TA in which the cell 120 served by the eNB 12 is located and a TAI 2 of a TA in which the cell 110 served by the NR gNB 11 is located. Based on the TAU mechanism in the LTE system, when the terminal 14 moves in idle mode from the cell 110 to the cell 120, the terminal 14 receives the TAI 1 of the cell 120 broadcast by the eNB 12, and the terminal 14 triggers no TAU because the TAI 1 of the cell 120 is in the TAI list of the terminal 14. When the terminal 14 continues moving and moves from the cell 120 to the cell 130, the terminal 14 receives a TAI of the cell 130 broadcast by the eNB 13, and because the cell 120 follows a TAI planning rule in the LTE system, the TAI of the cell 120 may be the same as the TAI of the cell 130; and if the TAI of the cell 130 is also the TAI 1, the terminal 14 triggers no TAU because the TAI 1 of the cell 130 is also in the TAI list of the terminal 14. When the terminal 14 stays in the cell 130 and the NGC needs to send downlink traffic to the terminal 14, the NGC cannot find the terminal 14 through paging because the eNB 13 is not connected to the NGC.

Apparently, the existing TA planning mechanism is liable to insufficient communication reliability. To resolve this problem, in the embodiments of this application, two TAs are planned for a base station supporting two communications standards and two area identities of the two TAs are broadcast. Specifically, the following several embodiments are provided. These embodiments are described below with reference to specific scenarios.

Figure 2:
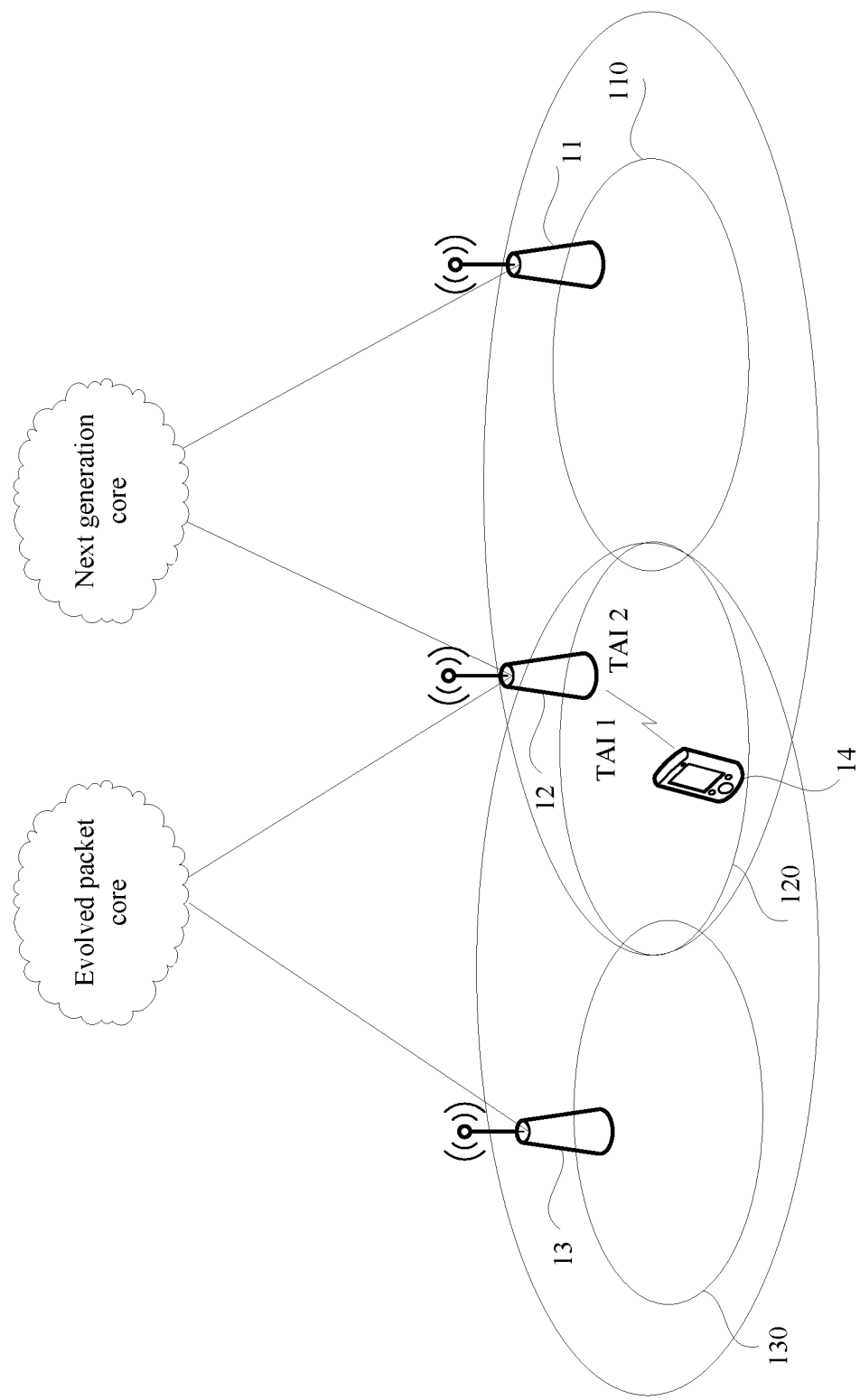
FIG. 2 is a schematic diagram of a scenario according to an embodiment of this application.
Figure 3:
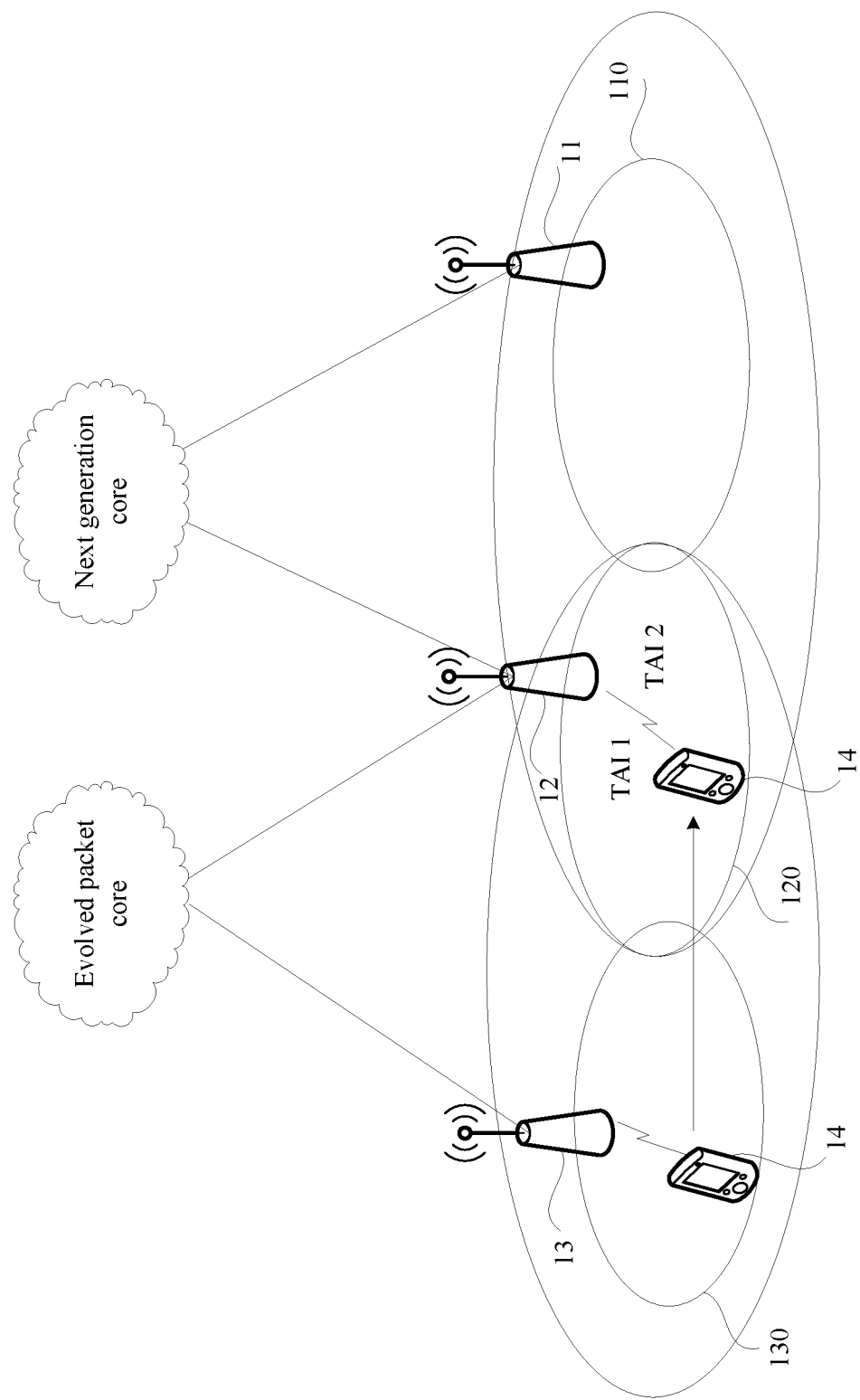
FIG. 3 is a schematic diagram of another scenario according to an embodiment of this application.
Figure 4:
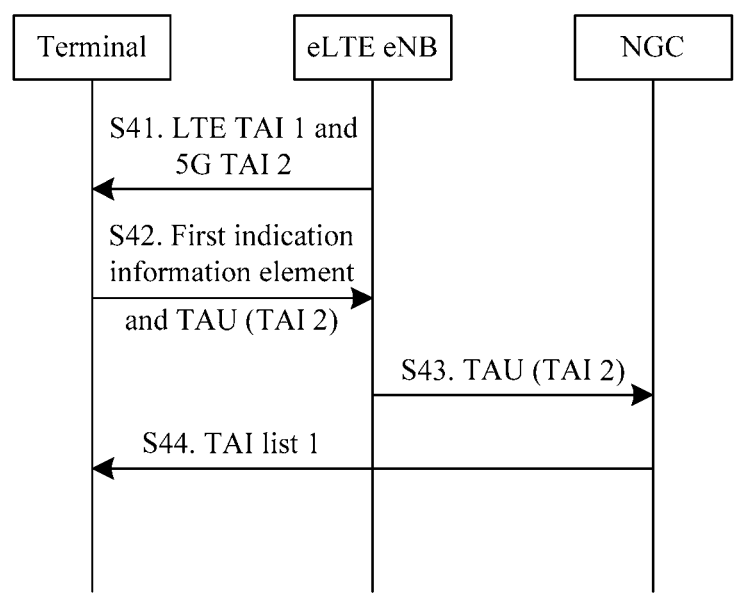
FIG. 4 is a signaling diagram of a communication method according to an embodiment of this application.
Figure 5:
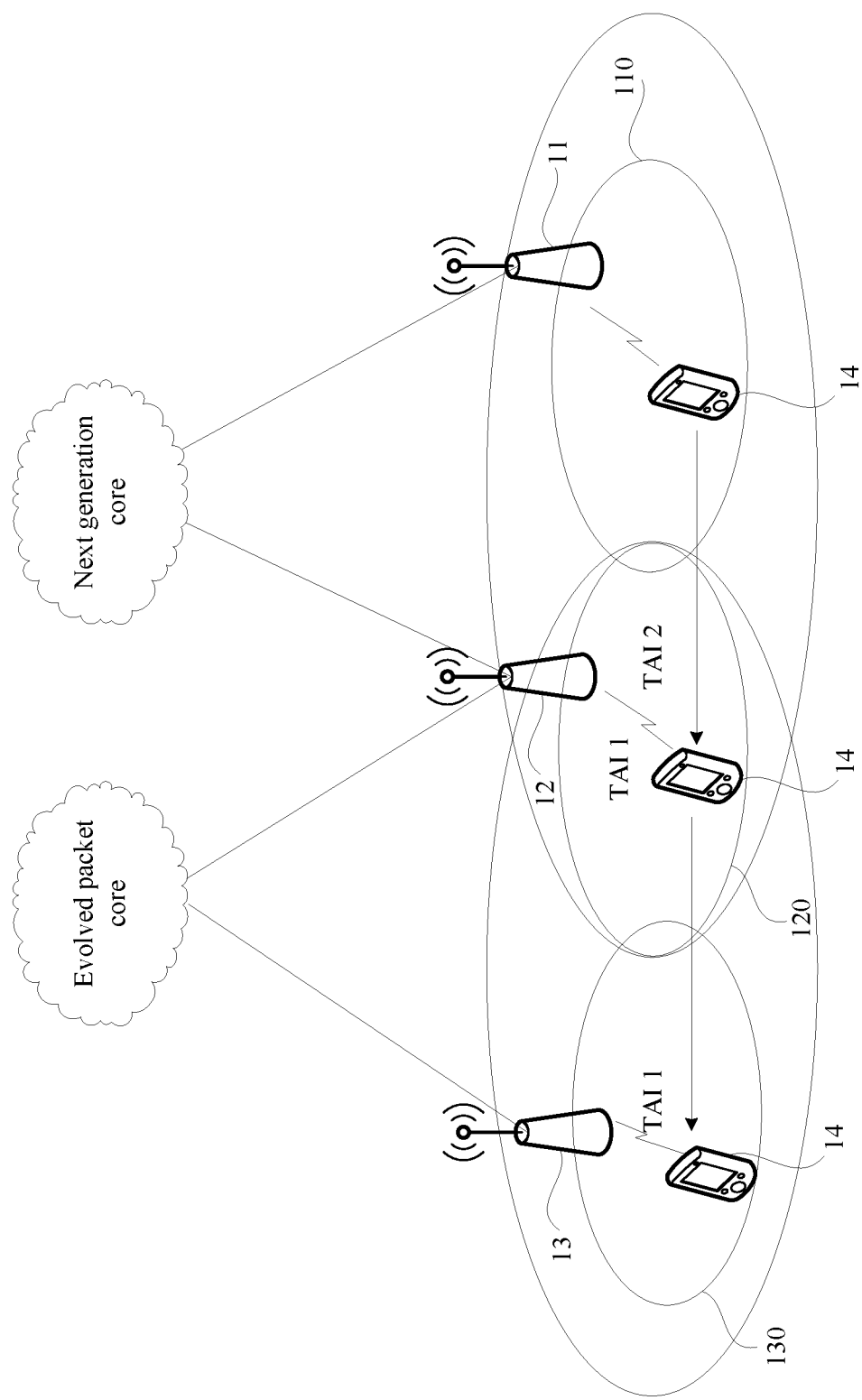
FIG. 5 is a schematic diagram of still another scenario according to an embodiment of this application.

FIG. 2 is a schematic diagram of a scenario according to an embodiment of this application. FIG. 3 is a schematic diagram of another scenario according to an embodiment of this application. FIG. 4 is a signaling diagram of a communication method according to an embodiment of this application. FIG. 5 is a schematic diagram of still another scenario according to an embodiment of this application. In this embodiment, a same planning rule is applied to area identities of cells in a 4G communications system and area identities of cells in a 5G communications system. In other embodiments, alternatively, different planning rules may be applied to area identities of cells in a 4G communications system and area identities of cells in a 5G communications system.

As shown in FIG. 2, two different TAIs may be assigned to a cell served by an eLTE eNB. For example, two different TAIs assigned to a cell 120 served by an eNB 12 are a TAI 1 and a TAI 2. One is used for the 4G communications system and the other is used for the 5G communications system. For example, the TAI 1 is used for the 4G communications system and the TAI 2 is used for the 5G communications system. The TAI 1 is used to identify an area used, in the 4G communications system, for location management for a terminal, and the TAI 2 is used to identify an area used, in the 5G communications system, for location management for a terminal. When a terminal 14 enters the cell 120 served by the eNB 12, the terminal 14 receives information broadcast by the eNB 12. The information broadcast by the eNB 12 may include both the TAI 1 and the TAI 2. There are the following two cases in which the terminal 14 enters the cell 120 served by the eNB 12.

Case 1:

As shown in FIG. 3, the terminal 14 enters the cell 120 served by the eNB 12 from a cell 130 served by an eNB 13, and before the terminal 14 enters the cell 120 served by the eNB 12 from the cell 130 served by the eNB 13, a TAI list stored in the terminal 14 is allocated by an EPC, and the TAI list allocated by the EPC does not include any TAI of a cell of the 5G communications system. After the terminal 14 enters the cell 120 served by the eNB 12 from the cell 130 served by the eNB 13, the terminal 14 receives information broadcast by the eNB 12. The information broadcast by the eNB 12 includes the TAI 1 and the TAI 2. The terminal 14 may receive the TAI 1 and the TAI 2 simultaneously, or may receive the TAI 1 and the TAI 2 at different times.

If the terminal 14 supports both the 4G communications system and the 5G communications system, when the terminal 14 enters the cell 120 served by the eNB 12 from the cell 130 served by the eNB 13, the terminal 14 initiates a TAU to an NGC provided that the eNB 12 is connected to the NGC. To be specific, when the terminal 14 enters the cell 120 served by the eNB 12 from the cell 130 served by the eNB 13, regardless of whether a TAI of the 4G communications system, for example, the TAI 1, broadcast by the eNB 12 is in the TAI list of the terminal, the terminal 14 initiates a TAU to the core network NGC of the 5G communications system provided that the information broadcast by the eNB 12 includes a TAI of the 5G communications system.

Because the eNB 12 is connected to both the EPC and the NGC, and the eNB 12 only forwards without parsing the TAU initiated by the terminal 14, the terminal 14 further needs to send a first indication information element to the eNB 12 when initiating the TAU, and the first indication information element is used to indicate that the TAU initiated by the terminal 14 is initiated to the NGC.

The first indication information element may be sent to the eNB 12 together with the TAU. For example, the first indication information element and the TAU message are sent to the eNB 12 in one radio resource control (RRC) message. Alternatively, the first indication information element and the TAU may be sent to the eNB 12 separately. For example, the terminal 14 adds the first indication information element to an RRC message and sends the RRC message to the eNB 12; and the terminal 14 sends the TAU to the NGC by using a non-access stratum (NAS) message. Correspondingly, as shown in FIG. 4, signaling interaction between a terminal, an eLTE eNB, and an NGC includes the following S41 to S44.

S41. The eLTE eNB broadcasts, to a terminal, a TAI 1 applicable to a 4G communications system and a TAI 2 applicable to a 5G communications system.

S42. The terminal sends a first indication information element and a TAU to the eLTE eNB.

The first indication information element is used to indicate that the TAU initiated by the terminal is initiated to the NGC, and the TAU includes the TAI 2.

S43. The eLTE eNB sends the TAU to the NGC according to the first indication information element.

S44. The NGC sends a TAI list 1 to the terminal through the eLTE eNB.

In addition, it should be noted that the reason why the eNB 12 broadcasts the TAI 1 is to ensure compatibility with a terminal supporting only the 4G communications system. For example, the terminal 14 is a terminal supporting only the 4G communications system, and both the cell 130 and the cell 120 are cells in the 4G communications system. In this case, the TAIs of the two cells may be the same or may be different. Before the terminal 14 moves from the cell 130 to the cell 120, the TAI list of the terminal 14 is allocated by the EPC. After the terminal 14 moves from the cell 130 to the cell 120, the terminal 14 needs to detect whether the TAI 1 broadcast by the eNB 12 is in the TAI list of the terminal 14. If the TAI 1 broadcast by the eNB 12 is in the TAI list of the terminal 14, the terminal 14 triggers no TAU. If the TAI 1 broadcast by the eNB 12 is not in the TAI list of the terminal 14, the terminal 14 needs to initiate a TAU to the EPC.

Case 2:

As shown in FIG. 5, the terminal 14 enters the cell 120 served by the eNB 12 from the cell 110 served by the NR gNB 11, and before the terminal 14 enters the cell 120 served by the eNB 12 from the cell 110 served by the NR gNB 11, a TAI list stored in the terminal 14 is allocated by the NGC, and the TAI list allocated by the NGC does not include the TAI 1. After entering the cell 120 served by the eNB 12 from the cell 110 served by the NR gNB 11, the terminal 14 detects whether a TAI of the 5G communications system, for example, the TAI 2, broadcast by the eNB 12 is in the TAI list of the terminal 14. If the TAI 2 is not in the TAI list of the terminal 14, the terminal 14 initiates a TAU to the NGC. If the TAI 2 is in the TAI list of the terminal 14, the terminal 14 initiates no TAU to the NGC.

In addition, in this embodiment, for a terminal that supports both the 4G communications system and the 5G communications system, when the terminal 14 enters the cell 120 served by the eNB 12 from the cell 110 served by the NR gNB 11, the terminal 14 may not detect whether the TAI 1 of the 4G communications system broadcast by the eNB 12 is in the TAI list of the terminal 14. In other embodiments, when the terminal 14 enters the cell 120 served by the eNB 12 from the cell 110 served by the NR gNB 11, the terminal 14 further needs to detect whether the TAI 1 of the 4G communications system broadcast by the eNB 12 is in the TAI list of the terminal 14.

As shown in FIG. 5, when the terminal 14 enters the cell 120 served by the eNB 12 from the cell 110 served by the NR gNB 11, the terminal 14 does not detect whether the TAI 1 of the 4G communications system broadcast by the eNB 12 is in the TAI list of the terminal 14. However, when the terminal 14 continues moving and moves from the cell 120 to the cell 130, the terminal 14 detects whether a TAI broadcast by the eNB 13 is in the TAI list of the terminal 14. For example, if the TAI broadcast by the eNB 13 is the TAI 1, and the TAI 1 is not in the TAI list of the terminal 14, the terminal 14 initiates a TAU to the EPC.

In this embodiment, a base station supporting connectivity to a core network of a first communications standard and a core network of a second communications standard broadcasts a first area identity and a second area identity for the two communications standards. Therefore, when entering a cell served by the base station, a terminal supporting the two communications standards can receive the two area identities, and perform area updating based on the second area identity, for timely access to a communications system of the second communications standard or timely area updating. This reduces a failure probability of terminal paging, thereby improving communication reliability for the terminal.

In addition, in an alternative solution of the embodiment shown in FIG. 4, before the terminal initiates a TAU to the NGC through the eLTE eNB, the eLTE eNB obtains capability information of the terminal; and if the capability information indicates that the terminal supports the 5G communications system or that the terminal supports both the 4G communications system and the 5G communications system, when the terminal initiates a TAU to the NGC through the eLTE eNB, the terminal does not need to send indication information to the eLTE eNB but directly sends the TAU to the eLTE eNB, and the eLTE eNB directly sends the TAU to the NGC based on the capability information of the terminal. If the capability information indicates that the terminal supports only the 4G communications system, when the terminal initiates a TAU, the eLTE eNB directly sends the TAU to the EPC.

Figure 6:
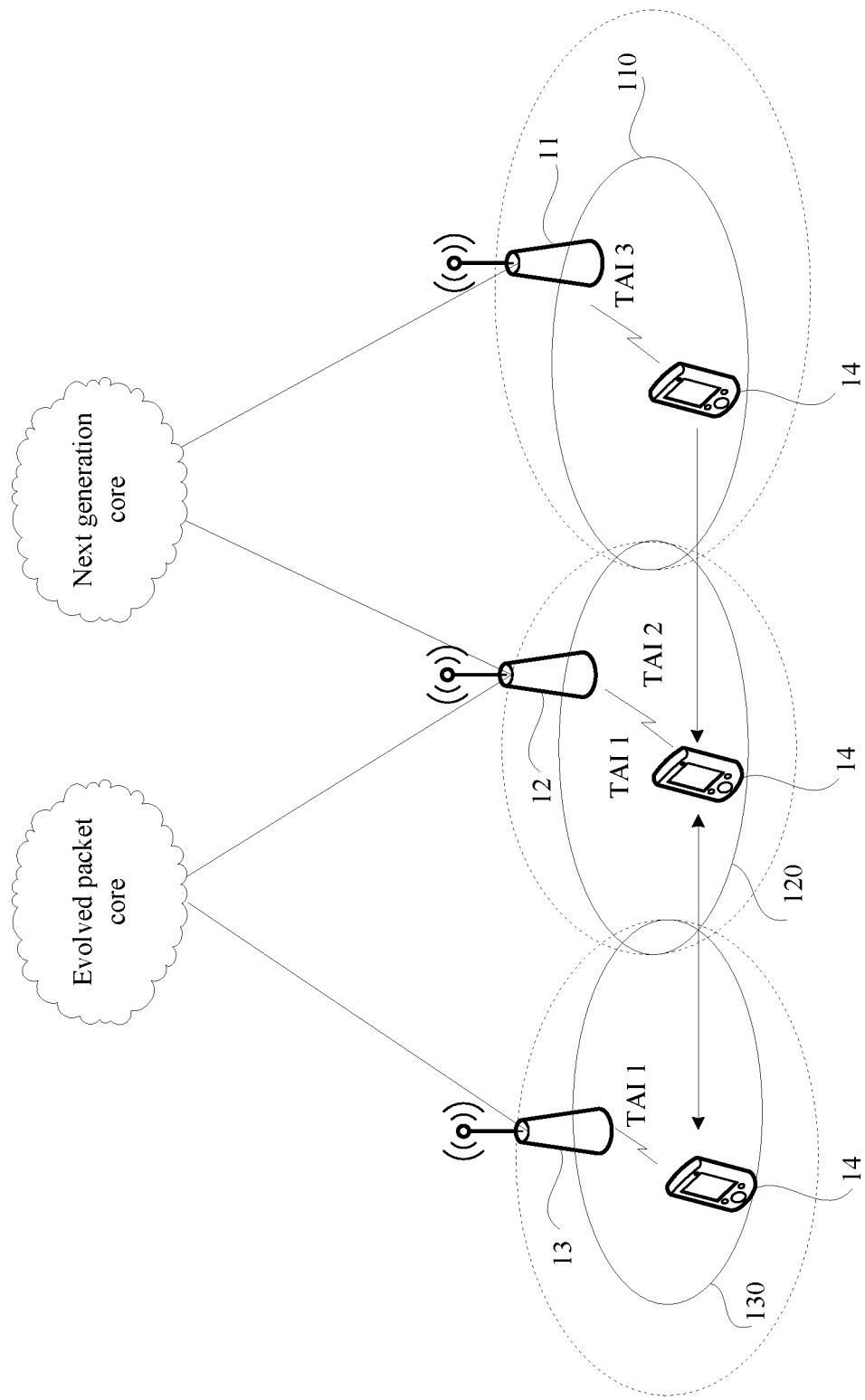
FIG. 6 is a schematic diagram of yet another scenario according to an embodiment of this application.
Figure 7:
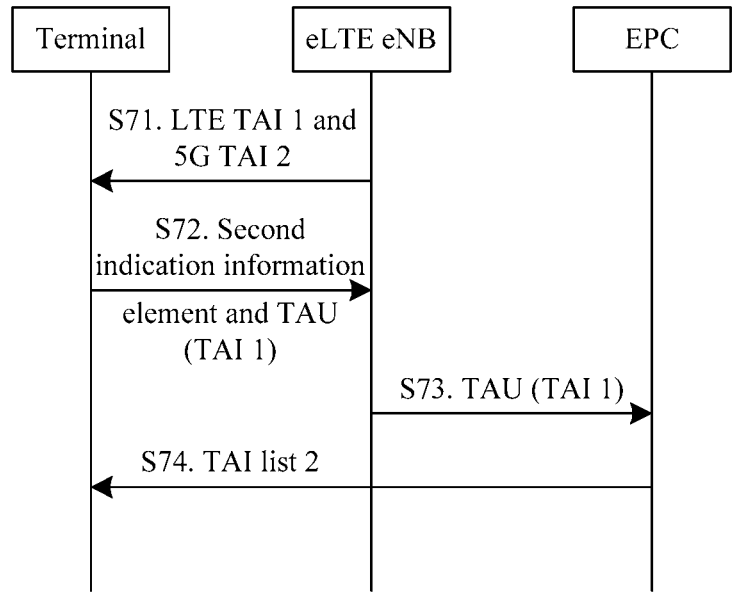
FIG. 7 is a signaling diagram of another communication method according to an embodiment of this application.

FIG. 6 is a schematic diagram of yet another scenario according to an embodiment of this application. FIG. 7 is a signaling diagram of another communication method according to an embodiment of this application. As shown in FIG. 6, information broadcast by an NR gNB 11 includes a TAI 3, information broadcast by an eNB 12 includes a TAI 1 and a TAI 2, where the TAI 1 is used for a 4G communications system and the TAI 2 is used for a 5G communications system, and information broadcast by an eNB 13 includes the TAI 1. A terminal 14 supports both the 4G communications system and the 5G communications system, the terminal 14 is registered with an NGC, and a TAI list allocated by the NGC to the terminal 14 includes the TAI 3. When the terminal 14 enters, in idle mode, a cell 120 served by the eNB 12 from a cell 110 served by the NR gNB 11, because the TAI 2 broadcast by the eNB 12 for the 5G communications system is not in the TAI list of the terminal 14, the terminal 14 initiates a TAU to the NGC, the NGC returns a TAI list 1 to the terminal 14, where the TAI list 1 includes the TAI 2, and the terminal 14 updates the original TAI list stored in the terminal 14 to the TAI list 1. If the terminal 14 continues moving and moves from the cell 120 served by the eNB 12 to a cell 130 served by the eNB 13, because the TAI 1 broadcast by the eNB 13 is not in the current TAI list 1 of the terminal 14, the eNB 13 is a base station of the 4G communications system, the cell 130 is a cell of LTE coverage, and the eNB 13 is not connected to the NGC, the terminal 14 initiates a TAU to an EPC, the EPC returns a TAI list 2 to the terminal 14, where the TAI list 2 includes the TAI 1, and the terminal 14 updates the TAI list 1 stored in the terminal 14 to the TAI list 2.

In addition, a format of the TAU initiated by the terminal 14 to the NGC is different from a format of the TAU initiated by the terminal 14 to the EPC. For example, the terminal 14 initiates a TAU of a 5G NAS format to the NGC, and the terminal 14 initiates a TAU of an EPC NAS format to the EPC.

As shown in FIG. 6, when the terminal 14 moves in idle mode, a format of a TAU initiated by the terminal 14 may be determined based on a support capability of a cell in which the terminal 14 is located. If the cell in which the terminal 14 is located supports connectivity to the NGC, the terminal 14 preferably initiates a TAU of the 5G NAS format; or if the cell in which the terminal 14 is located supports only connectivity to the EPC, the terminal 14 initiates a TAU of the EPC NAS format.

In addition, as shown in FIG. 6, the terminal 14 supports both the 4G communications system and the 5G communications system. When the terminal 14 moves from the cell 120 served by the eNB 12 to the cell 130 served by the eNB 13, because the TAI 1 broadcast by the eNB 13 is not in the current TAI list 1 of the terminal 14, the eNB 13 is a base station of the 4G communications system, the cell 130 is a cell of LTE coverage, and the eNB 13 is not connected to the NGC, the terminal 14 initiates a TAU of the EPC NAS format to the EPC. When the terminal 14 enters the cell 120 served by the eNB 12 from the cell 130 served by the eNB 13, regardless of whether the TAI 1 of the 4G communications system broadcast by the eNB 12 is in the TAI list of the terminal, the terminal 14 sends a TAU of the 5G NAS format to the core network NGC of the 5G communications system provided that the eNB 12 is connected to the NGC. When the terminal 14 moves back and forth between the cell 120 served by the eNB 12 and the cell 130 served by the eNB 13, for each cell reselection, the terminal 14 needs to send TAUs of different formats to different core networks. To be specific, the terminal 14 frequently sends TAUs of the 5G NAS format to the NGC and frequently sends TAUs of the EPC NAS format to the EPC. Consequently, a ping-pong phenomenon occurs.

To resolve this problem, based on the embodiment shown in FIG. 6, when the terminal 14 enters the cell 120 served by the eNB 12 from the cell 110 served by the NR gNB 11, the terminal 14 initiates a TAU to the EPC. In addition, when the terminal 14 enters the cell 120 served by the eNB 12 from the cell 110 served by the NR gNB 11, whether the terminal 14 initiates a TAU to the NGC depends on whether a TAI broadcast by the eNB 12 for the 5G communications system is in a current TAI list of the terminal 14. A principle thereof is the same as that in the embodiment shown in FIG. 5, and details are not described herein again.

In this embodiment, if a TAI broadcast by the eNB 12 for the 5G communications system is in the TAI list configured by the NGC for the terminal 14 when the terminal 14 enters the cell 120 served by the eNB 12 from the cell 110 served by the NR gNB 11, the terminal 14 does not need to initiate a TAU to the NGC, but still needs to initiate a TAU to the EPC, and the EPC returns a TAI list to the terminal 14. In this embodiment, when the terminal 14 receives, in the cell 120 served by the eNB 12, the TAI list sent by the EPC, the terminal 14 keeps an original TAI list, namely, the TAI list configured by the NGC for the terminal 14, and also stores the TAI list sent by the EPC.

Because the eNB 12 is connected to both the EPC and the NGC, and the eNB 12 only forwards without parsing the TAU initiated by the terminal 14, the terminal 14 further needs to send a second indication information element to the eNB 12 when initiating the TAU, and the second indication information element is used to indicate that the TAU initiated by the terminal 14 is initiated to the EPC. Correspondingly, as shown in FIG. 7, signaling interaction between a terminal, an eLTE eNB, and an EPC includes the following S71 to S74.

S71. The eLTE eNB broadcasts, to a terminal, a TAI 1 applicable to a 4G communications system and a TAI 2 applicable to a 5G communications system.

S72. The terminal sends a second indication information element and a TAU to the eLTE eNB.

The second indication information element is used to indicate that the TAU initiated by the terminal is initiated to the EPC, and a message sent by the terminal to the eLTE eNB further includes the TAI 1.

S73. The eLTE eNB sends the TAU to the EPC according to the second indication information element.

S74. The EPC sends a TAI list 2 to the terminal through the eLTE eNB.

The TAI list 2 includes the TAI 1.

In this embodiment, when the terminal 14 enters the cell 120 served by the eNB 12 from the cell 110 served by the NR gNB 11, the terminal 14 may initiate a TAU to the EPC each time the terminal 14 enters the cell 120 served by the eLTE eNB 12 from the cell 110 served by the NR gNB 11, or may initiate a TAU to the EPC after the terminal 14 determines that a ping-pong phenomenon has occurred, or may initiate a TAU to the EPC under instruction of a core network after the core network finds that a ping-pong phenomenon has occurred in the network.

In this embodiment, when the terminal enters the cell served by the eLTE eNB from a cell of the 5G communications system, the terminal initiates a TAU to the 4G core network through the eLTE eNB, and the 4G core network sends a TAI list to the terminal. When the terminal enters a cell served by an LTE eNB from the cell served by the eLTE eNB, because the terminal has stored the TAI list configured by the 4G core network, the TAI list may include a TAI of the cell served by the eLTE eNB and TAIs of cells served by LTE eNBs around the cell served by the eLTE eNB. When the terminal moves back and forth between the cell served by the eLTE eNB and the cell served by the LTE eNB, because both the TAI of the cell served by the eLTE eNB and the TAI of the cell served by the LTE eNB are in the TAI list of the terminal, for each cell reselection, the terminal does not need to send TAUs of different formats to different core networks. This prevents the terminal from frequently sending TAUs of the 5G NAS format to the NGC and frequently sending TAUs of the EPC NAS format to the EPC, thereby avoiding the ping-pong phenomenon.

Figure 8:
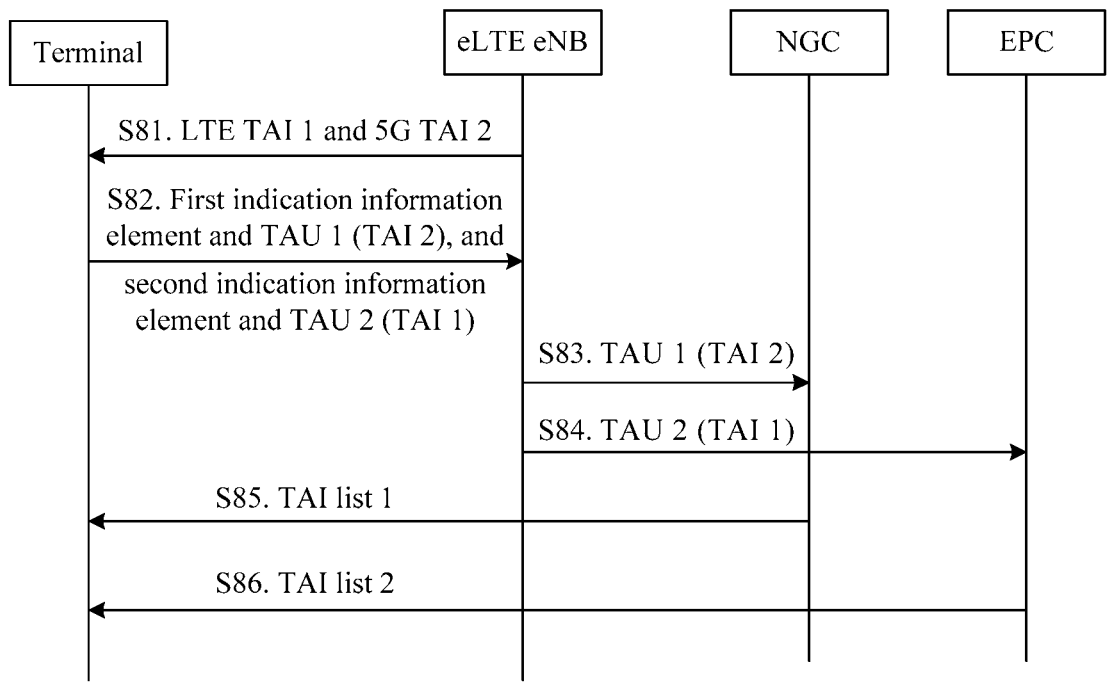
FIG. 8 is a signaling diagram of still another communication method according to an embodiment of this application.

FIG. 8 is a signaling diagram of still another communication method according to an embodiment of this application. Based on the embodiment shown in FIG. 6, if the terminal 14 supports both the 4G communications system and the 5G communications system, when the terminal 14 enters the cell 120 served by the eNB 12 from the cell 110 served by the NR gNB 11 or enters the cell 120 served by the eNB 12 from the cell 130 served by the eNB 13, the terminal 14 may initiate both a TAU of the EPC NAS format to the EPC and a TAU of the 5G NAS format to the NGC.

Because the eNB 12 is connected to both the EPC and the NGC, and the eNB 12 only forwards without parsing the TAU initiated by the terminal 14, when initiating both the TAU of the EPC NAS format and the TAU of the 5G NAS format, the terminal 14 further needs to send both a first indication information element and a second indication information element to the eNB 12. The first indication information element is used to indicate that the TAU of the 5G NAS format initiated by the terminal, denoted as a TAU 1, is initiated to the NGC. The second indication information element is used to indicate that the TAU of the EPC NAS format initiated by the terminal, denoted as a TAU 2, is initiated to the EPC. Correspondingly, as shown in FIG. 8, signaling interaction between a terminal, an eLTE eNB, an EPC, and an NGC includes the following S81 to S86.

S81. The eLTE eNB broadcasts, to a terminal, a TAI 1 applicable to a 4G communications system and a TAI 2 applicable to a 5G communications system.

S82. The terminal sends a first indication information element, a TAU 1, a second indication information element, and a TAU 2 to the eLTE eNB.

The first indication information element is used to indicate that the TAU 1 initiated by the terminal is initiated to the NGC. The second indication information element is used to indicate that the TAU 2 initiated by the terminal is initiated to the EPC. The TAU 1 includes the TAI 2, and the TAU 2 includes the TAI 1.

S83. The eLTE eNB sends the TAU 1 to the NGC.

S84. The eLTE eNB sends the TAU 2 to the EPC.

S85. The NGC sends a TAI list 1 to the terminal through the eLTE eNB.

S86. The EPC sends a TAI list 2 to the terminal through the eLTE eNB.

If the TAI list 1 includes the TAI 2 and a TAI 3 and the TAI list 2 includes the TAI 1, after receiving the TAI list 1 and the TAI list 2, the terminal may combine the TAI list 1 and the TAI list 2 into a total TAI list. This TAI list includes TAIs in the TAI list 1 and TAIs in the TAI list 2. The TAI list is a TAI list of a larger collection than the TAI list 1 or the TAI list 2.

Because the TAI 3 broadcast by the NR gNB 11 is in the TAI list of a larger collection and the TAI 2 of the 5G communications system broadcast by the eNB 12 is also in the TAI list of a larger collection, when the terminal 14 moves back and forth between the cell 110 and the cell 120, the terminal 14 does not need to initiate TAUs frequently. Likewise, because the TAI 1 of the 4G communications system broadcast by the eNB 12 is in the TAI list of a larger collection and the TAI 1 broadcast by the eNB 13 is also in the TAI list of a larger collection, when the terminal 14 moves back and forth between the cell 120 and the cell 130, the terminal 14 does not need to initiate TAUs frequently either. In other words, the TAI list 1 and the TAI list 2 form a TAI list of a larger collection, so that the terminal 14 initiates no TAU when moving between cells corresponding to the TAI list of a larger collection, and the terminal 14 does not need to frequently initiate TAUs of different formats to different core networks when a core network corresponding to the terminal 14 changes.

In this embodiment, the terminal 14 may initiate both a TAU of the EPC NAS format to the EPC and a TAU of the 5G NAS format to the NGC each time the terminal 14 enters the cell served by the eLTE eNB, or after the terminal 14 determines that a ping-pong phenomenon has occurred, or under instruction of a core network after the core network finds that a ping-pong phenomenon has occurred in the network.

In this embodiment, when moving to the cell served by the eLTE eNB, the terminal sends area updates of different formats to the 4G core network and the 5G core network, and the 4G core network and the 5G core network allocate different TAI lists to the terminal, where the two TAI lists form a TAI list of a larger collection, so that the terminal initiates no TAU when moving between cells corresponding to the TAI list of a larger collection, and the terminal does not initiate TAUs frequently when a core network corresponding to the terminal changes. This saves air interface resources.

Figure 9:
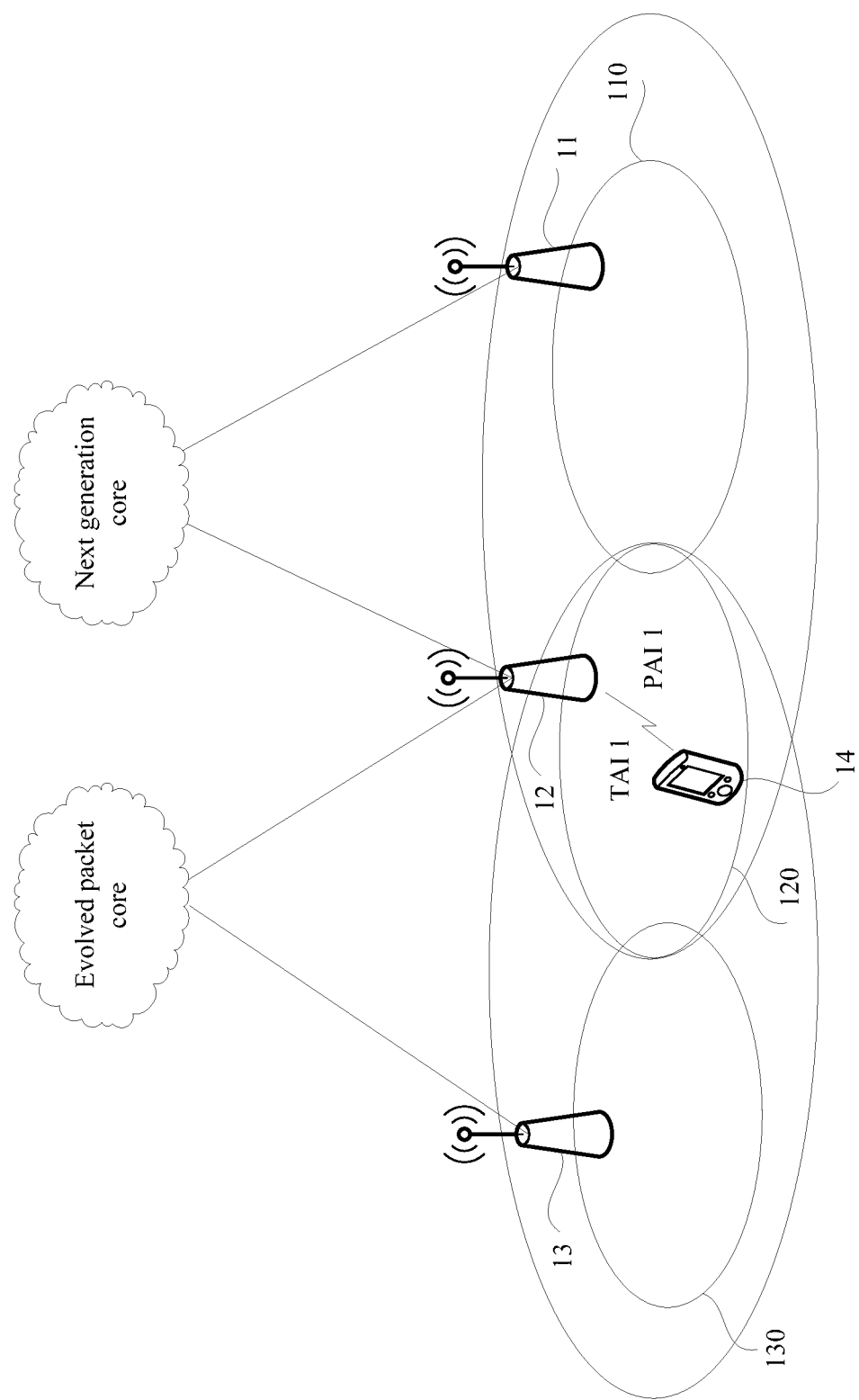
FIG. 9 is a schematic diagram of still yet another scenario according to an embodiment of this application.

FIG. 9 is a schematic diagram of still yet another scenario according to an embodiment of this application. In an alternative solution of the embodiment shown in FIG. 2, information broadcast by the eNB 12 may include two area identities of different formats, for example, a first area identity and a second area identity; and the first area identity may be a tracking area code (TAC), and the second area identity may be a paging area code (PAC). A TAI includes a public land mobile network identity (PLMN ID) and a TAC, and a paging area identity (PAI) includes a PLMN ID and a PAC. The TAC and the PAC are of different formats, for example, different lengths. As shown in FIG. 9, for the terminal 14, a PLMN ID is fixed if an operator for the terminal 14 is fixed. Because the TAC and the PAC are of different formats, the TAI and the PAI are also of different formats. Therefore, as shown in FIG. 9, a TAI 1 is used to identify an area used, in a 4G communications system, for location management for a terminal, and a PAI 1 is used to identify an area used, in a 5G communications system, for location management for a terminal. When the terminal 14 enters a cell served by the eNB 12, the eNB 12 broadcasts the TAI 1 and the PAI 1. When the terminal 14 receives the TAI 1 and the PAI 1, the terminal 14 can determine, based on different formats of the TAI 1 and the PAI 1, that the PAI 1 is used for the 5G communications system and the TAI 1 is used for the 4G communications system. Alternatively, when the terminal 14 enters a cell served by the eNB 12, the eNB 12 broadcasts the TAC 1 and the PAC 1. When the terminal 14 receives the TAC 1 and the PAC 1, the terminal 14 can determine, based on different formats of the TAC 1 and the PAC 1, that the PAC 1 is used for the 5G communications system and the TAC 1 is used for the 4G communications system.

In this embodiment, the eLTE eNB broadcasts the first area identity and the second area identity that are of different formats, so that a terminal in a cell served by the eLTE eNB can quickly determine, based on different formats of the first area identity and the second area identity, an area identity used for the 5G communications system and an area identity used for the 4G communications system.

In addition, based on the embodiment shown in FIG. 2, information broadcast by the eNB 12 may include two area identities of a same format, for example, a first area identity and a second area identity. The first area identity is the TAC 1 and the second area identity is the TAC 2. Because a TAI includes a PLMN ID and a TAC, if an operator for the terminal 14 is fixed, the PLMN ID is fixed. Therefore, if the TAC 1 is different from the TAC 2, the TAI 1 is different from the TAI 2. If the terminal 14 supports both 4G and 5G; the eNB 12 further needs to send first indication information and second indication information to the terminal 14, where the first indication information is used to indicate that the first area identity, namely, the TAC 1, is used for 4G and the second indication information is used to indicate that the second area identity is used for 5G; or the eNB 12 sends one piece of indication information to the terminal 14, where the indication information is used to indicate that the first area identity, namely, the TAC 1, is used for 4G and that the second area identity, namely, the TAC 2, is used for 5G by default; or the eNB 12 sends one piece of indication information to the terminal 14, where the indication information is used to indicate that the second area identity, namely, the TAC 2, is used for 5G, and that the first area identity, namely, the TAC 1, is used for 4G by default. If the terminal 14 supports only 4G; the eNB 12 needs to send only one piece of indication information to the terminal 14, where the indication information is used to indicate that the first area identity, namely, the TAC 1, is used for 4G; or the indication information is used to indicate that the second area identity, namely, the TAC 2, is used for 5G.

In this embodiment, the eLTE eNB sends the first indication information and the second indication information to indicate which of the first area identity and the second area identity that are broadcast by the eLTE eNB is the area identity used for the 5G communications system and which is the area identity used for the 4G communications system, so that the terminal can accurately distinguish between the first area identity and the second area identity of a same format that are broadcast by the eLTE eNB. Alternatively, the eLTE eNB sends one piece of indication information to indicate which of the first area identity and the second area identity that are broadcast by the eLTE eNB is the area identity used for the 5G communications system or the area identity used for the 4G communications system, so that the terminal can accurately distinguish one of the first area identity and the second area identity of a same format that are broadcast by the eLTE eNB, where the other is known by default. This effectively reduces an amount of data sent by the eLTE eNB.

Figure 10:
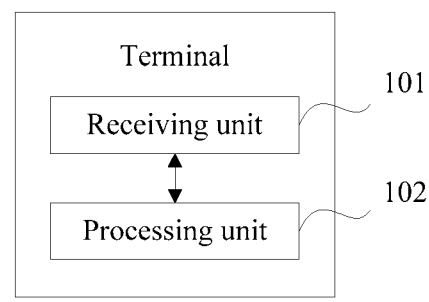
FIG. 10 is a schematic structural diagram of a terminal according to an embodiment of this application.

FIG. 10 is a schematic structural diagram of a communications device according to an embodiment of this application. The communications device is applied to a communications system supporting a first communications standard and a second communications standard. The first communications standard may be 4G, and the second communications standard may be 5G. The communications system further includes a base station supporting connectivity to a core network of the first communications standard and a core network of the second communications standard. Information broadcast by the base station includes a first area identity, where the first area identity is used to identify an area used, in the first communications standard, for location management for a terminal. The terminal supports the first communications standard and the second communications standard. As shown in FIG. 10, the communications device is located in a terminal and includes a receiving unit 101 and a processing unit 102. The receiving unit 101 is configured to receive the information broadcast by the base station. The processing unit 102 is configured to: when the terminal enters a cell served by the base station from a cell of the first communications standard, and the information broadcast by the base station includes a second area identity, initiate an area update to the core network of the second communications standard, where the second area identity is used to identify an area used, in the second communications standard, for location management for a terminal; or the processing unit 102 is configured to: when the terminal enters a cell served by the base station from a cell of the second communications standard, and the information broadcast by the base station includes a second area identity that does not belong to a current area list of the terminal, initiate an area update to the core network of the second communications standard, where the second area identity is used to identify an area used, in the second communications standard, for location management for a terminal.

In FIG. 10, the processing unit 102 is further configured to send a first indication information element to the base station, where the first indication information element is used to indicate that the area update initiated by the processing unit 102 is initiated to the core network of the second communications standard.

In this embodiment, when the terminal enters the cell served by the base station from a cell of the second communications standard, the processing unit 102 is further configured to initiate an area update to the core network of the first communications standard.

In this embodiment, the processing unit 102 is further configured to send a second indication information element to the base station, where the second indication information element is used to indicate that the area update initiated by the processing unit 102 is initiated to the core network of the first communications standard.

In this embodiment, a format of the first area identity is different from that of the second area identity.

In this embodiment, a format of the first area identity is the same as that of the second area identity, and the receiving unit 101 is further configured to: receive first indication information and second indication information, where the first indication information is used to indicate that the first area identity is used for the first communications standard, and the second indication information is used to indicate that the second area identity is used for the second communications standard; or receive indication information, where the indication information is used to indicate that the first area identity is used for the first communications standard, and that the second area identity is used for the second communications standard by default; or receive indication information, where the indication information is used to indicate that the second area identity is used for the second communications standard, and that the first area identity is used for the first communications standard by default.

The communications device in the embodiment shown in FIG. 10 may be used to execute the technical solutions of the foregoing method embodiments. Implementation principles and technical effects of the communications device are similar to those of the method embodiments, and details are not described herein again.

Figure 11:
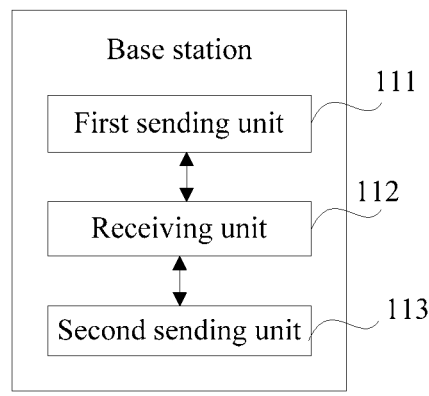
FIG. 11 is a schematic structural diagram of a base station according to an embodiment of this application.

FIG. 11 is a schematic structural diagram of a communications device according to an embodiment of this application. The communications device is applied to a communications system supporting a first communications standard and a second communications standard. The first communications standard may be 4G, and the second communications standard may be 5G. The communications system further includes a base station supporting connectivity to a core network of the first communications standard and a core network of the second communications standard. As shown in FIG. 11, the communications device is located in the base station and includes: a first sending unit 111, a receiving unit 112, and a second sending unit 113. The first sending unit 111 is configured to broadcast a first area identity and a second area identity, where the first area identity is used to identify an area used, in the first communications standard, for location management for a terminal, and the second area identity is used to identify an area used, in the second communications standard, for location management for a terminal. The receiving unit 112 is configured to: when a terminal enters a cell served by the base station from a cell of the first communications standard, or when a terminal enters a cell served by the base station from a cell of the second communications standard and the second area identity does not belong to a current area list of the terminal, receive a first area update request sent by the terminal. The second sending unit 113 is configured to send the first area update request to the core network of the second communications standard.

In FIG. 11, the receiving unit 112 is further configured to receive a first indication information element sent by the terminal, where the first indication information element is used to indicate that the area update initiated by the terminal is initiated to the core network of the second communications standard, and the second sending unit 113 is configured to send the first area update request to the core network of the second communications standard according to the first indication information element.

In this embodiment, the receiving unit 112 is further configured to: when the terminal enters the cell served by the base station from a cell of the second communications standard, receive a second area update request initiated by the terminal to the core network of the first communications standard, and the second sending unit 113 is further configured to send the second area update request to the core network of the first communications standard.

In this embodiment, the receiving unit 112 is further configured to receive a second indication information element sent by the terminal, where the second indication information element is used to indicate that the area update initiated by the terminal is initiated to the core network of the first communications standard, and the second sending unit 113 is configured to send the second area update request to the core network of the first communications standard according to the second indication information element.

In this embodiment, a format of the first area identity is different from that of the second area identity.

In this embodiment, a format of the first area identity is the same as that of the second area identity, and the first sending unit 111 is further configured to: send first indication information and second indication information to the terminal, where the first indication information is used to indicate that the first area identity is used for the first communications standard, and the second indication information is used to indicate that the second area identity is used for the second communications standard; or send indication information to the terminal, where the indication information is used to indicate that the first area identity is used for the first communications standard, and that the second area identity is used for the second communications standard by default; or send indication information to the terminal, where the indication information is used to indicate that the second area identity is used for the second communications standard, and that the first area identity is used for the first communications standard by default.

The communications device in the embodiment shown in FIG. 11 may be used to execute the technical solutions of the foregoing method embodiments. Implementation principles and technical effects of the communications device are similar to those of the method embodiments, and details are not described herein again.

It should be understood that division of the units in the terminal or the base station is merely division based on logical functions, and in an actual implementation, all or some of the units may be integrated into one physical entity or may be separated from each other physically. The units may all be implemented in a form of software invoked by using a processing element or may all be implemented in a form of hardware. Alternatively, some units may be implemented in a form of software invoked by using a processing element and some units may be implemented in a form of hardware. For example, the receiving unit may be an independently disposed processing element or may be integrated into, for example, a chip of the base station or the terminal for implementation. Alternatively, the receiving unit may be stored in a memory of the base station or the terminal in a form of a program, where a processing element of the base station or the terminal invokes the program to perform functions of the foregoing units. Implementation of other units is similar to this. In addition, all or some of these units may be integrated together or may be implemented independently. The processing element herein may be an integrated circuit capable of signal processing. In an implementation process, steps in the foregoing methods or the foregoing units can be implemented by using a hardware integrated logic circuit in the processing element, or by using instructions in a form of software. In addition, the foregoing receiving unit is a unit controlling reception that can receive, through a receiving apparatus such as an antenna and a radio frequency apparatus of the terminal or the base station, information sent by a base station. The foregoing first sending unit is a unit controlling transmission that can send information to the terminal through a sending apparatus such as an antenna and a radio frequency apparatus of the base station. The second sending unit is a unit controlling transmission that can send information to a core network through an interface between the base station and a core network device.

For example, the foregoing units may be configured as one or more integrated circuits to implement the foregoing method, for example, one or more application-specific integrated circuits (ASIC), one or more microprocessors (DSP), or one or more field programmable gate arrays (FPGA). For another example, when one of the foregoing units is implemented in a form of a program invoked by a processing element, the processing unit may be a general purpose processor, for example, a central processing unit (CPU) or other processors that can invoke a program. For another example, these units may be integrated and implemented in a form of a system-on-a-chip (SOC).

Figure 12:
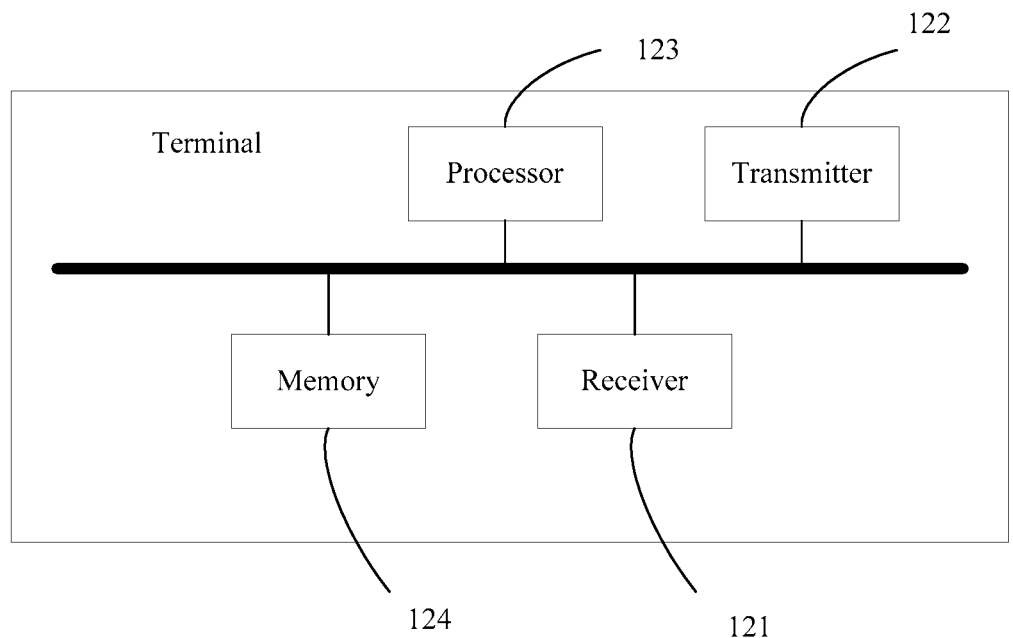
FIG. 12 is a schematic structural diagram of another terminal according to an embodiment of this application.

FIG. 12 is a schematic structural diagram of another terminal according to an embodiment of this application. As shown in FIG. 12, the terminal includes a receiver 121, a transmitter 122, a processor 123, and a memory 124. The terminal is in a communications system supporting a first communications standard and a second communications standard. The first communications standard may be 4G and the second communications standard may be 5G. The communications system further includes a base station supporting connectivity to a core network of the first communications standard and a core network of the second communications standard. Information broadcast by the base station includes a first area identity, where the first area identity is used to identify an area used, in the first communications standard, for location management for a terminal. The terminal supports the first communications standard and the second communications standard. The receiver 121 is configured to receive the information broadcast by the base station. The processor 123 is configured to: when the terminal enters a cell served by the base station from a cell of the first communications standard, and the information broadcast by the base station includes a second area identity, initiate an area update to the core network of the second communications standard, where the second area identity is used to identify an area used, in the second communications standard, for location management for a terminal; or the processor 123 is configured to: when the terminal enters a cell served by the base station from a cell of the second communications standard, and the information broadcast by the base station includes a second area identity that does not belong to a current area list of the terminal, initiate an area update to the core network of the second communications standard, where the second area identity is used to identify an area used, in the second communications standard, for location management for a terminal.

In FIG. 12, the processor 123 is further configured to send a first indication information element to the base station, where the first indication information element is used to indicate that the area update initiated by the processor 123 is initiated to the core network of the second communications standard.

In this embodiment, when the terminal enters the cell served by the base station from a cell of the second communications standard, the processor 123 is further configured to initiate an area update to the core network of the first communications standard.

In this embodiment, the processor 123 is further configured to send a second indication information element to the base station, where the second indication information element is used to indicate that the area update initiated by the processor 123 is initiated to the core network of the first communications standard.

In this embodiment, a format of the first area identity is different from that of the second area identity.

In this embodiment, a format of the first area identity is the same as that of the second area identity, and the receiver 121 is further configured to: receive first indication information and second indication information, where the first indication information is used to indicate that the first area identity is used for the first communications standard, and the second indication information is used to indicate that the second area identity is used for the second communications standard; or receive indication information, where the indication information is used to indicate that the first area identity is used for the first communications standard, and that the second area identity is used for the second communications standard by default; or receive indication information, where the indication information is used to indicate that the second area identity is used for the second communications standard, and that the first area identity is used for the first communications standard by default.

The terminal of the embodiment shown in FIG. 12 may be used to execute the technical solutions of the foregoing method embodiments. Implementation principles and technical effects of the terminal are similar to those of the method embodiments, and details are not described herein again.

The receiver 121 and the transmitter 122 may be connected to an antenna. In a downlink direction, the receiver 121 and the transmitter 122 receive, through the antenna, information sent by the base station and send the information to the processor 123 for processing. In an uplink direction, the processor 123 processes data of the terminal and sends processed data to the base station through the transmitter 122.

The memory 124 is configured to store a program for implementing the foregoing method embodiments or the units in the embodiment shown in FIG. 10. The processor 123 invokes the program to perform operations of the foregoing method embodiments, to implement the units shown in FIG. 10.

Alternatively, some or all of the foregoing units may be embedded into a chip of the terminal in a form of an integrated circuit for implementation. They can be implemented separately or may be integrated. To be specific, the foregoing units may be configured as one or more integrated circuits to implement the foregoing method, for example, one or more application-specific integrated circuits (ASIC), one or more microprocessors (DSP), or one or more field programmable gate arrays (FPGA).

Figure 13:
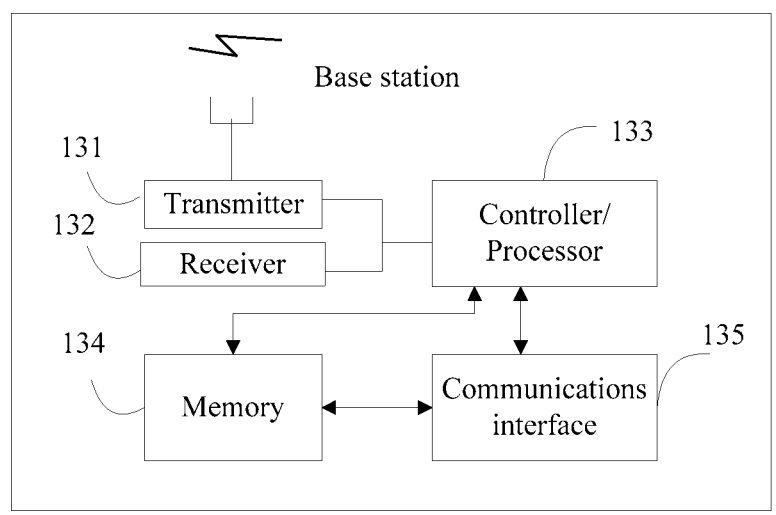
FIG. 13 is a schematic structural diagram of another base station according to an embodiment of this application.

FIG. 13 is a schematic structural diagram of another base station according to an embodiment of this application. As shown in FIG. 13, the base station includes a transmitter 131, a receiver 132, and a processor 133. The base station supports connectivity to a core network of a first communications standard and a core network of a second communications standard. The first communications standard may be 4G, and the second communications standard may be 5G. The transmitter 131 is configured to broadcast a first area identity and a second area identity, where the first area identity is used to identify an area used, in the first communications standard, for location management for a terminal, and the second area identity is used to identify an area used, in the second communications standard, for location management for a terminal. The receiver 132 is configured to: when a terminal enters a cell served by the base station from a cell of the first communications standard, or when a terminal enters a cell served by the base station from a cell of the second communications standard and the second area identity does not belong to a current area list of the terminal, receive a first area update request sent by the terminal. The transmitter 131 is further configured to send the first area update request to a core network of the second communications standard.

In FIG. 13, the receiver 132 is further configured to receive a first indication information element sent by the terminal, where the first indication information element is used to indicate that the area update initiated by the terminal is initiated to the core network of the second communications standard, and the transmitter 131 is configured to send the first area update request to the core network of the second communications standard according to the first indication information element.

In this embodiment, the receiver 132 is further configured to: when the terminal enters the cell served by the base station from a cell of the second communications standard, receive a second area update request initiated by the terminal to a core network of the first communications standard, and the transmitter 131 is further configured to send the second area update request to the core network of the first communications standard.

In this embodiment, the receiver 132 is further configured to receive a second indication information element sent by the terminal, where the second indication information element is used to indicate that the area update initiated by the terminal is initiated to the core network of the first communications standard, and the transmitter 131 is configured to send the second area update request to the core network of the first communications standard according to the second indication information element.

In this embodiment, a format of the first area identity is different from that of the second area identity.

In this embodiment, a format of the first area identity is the same as that of the second area identity, and the transmitter 131 is further configured to: send first indication information and second indication information to the terminal, where the first indication information is used to indicate that the first area identity is used for the first communications standard, and the second indication information is used to indicate that the second area identity is used for the second communications standard; or send indication information to the terminal, where the indication information is used to indicate that the first area identity is used for the first communications standard, and that the second area identity is used for the second communications standard by default; or send indication information to the terminal, where the indication information is used to indicate that the second area identity is used for the second communications standard, and that the first area identity is used for the first communications standard by default.

The base station of the embodiment shown in FIG. 13 may be used to execute the technical solutions of the foregoing method embodiments. Implementation principles and technical effects of the base station are similar to those of the method embodiments, and details are not described herein again.

The processor 133 may alternatively be a controller and is illustrated as a "controller/processor 133" in FIG. 13. The transmitter 131 and the receiver 132 are configured to support information transmission/reception between the base station and the terminal in the foregoing embodiment and support radio communication between the terminal and other a terminal. The processor 133 performs various functions for communicating with the terminal. In uplink, an uplink signal from the terminal is received by an antenna, demodulated (for example, a high frequency signal is demodulated into a baseband signal) by the receiver 132, and further processed by the processor 133 to restore service data and signaling information that are sent by the terminal. In downlink, service data and a signaling message are processed by the processor 133, and modulated (for example, a baseband signal is modulated into a high frequency signal) by the transmitter 131 to generate a downlink signal, and the downlink signal is transmitted to the terminal through the antenna.

The base station may further include a memory 134. The memory 134 is configured to store program code and data of the base station. The base station may further include a communications interface 135. The communications interface 135 is configured to support communication between the base station and other network entities (for example, a network device in the core network). For example, in an LTE system, the communications interface 135 may be an S1-U interface configured to support communication between the base station and an SGW, or the communications interface 135 may be an S1-MME interface configured to support communication between the base station and an MME.

The processor 133 is, for example, a central processing unit (CPU) and may be configured as one or more integrated circuits to implement the foregoing method, for example, one or more application-specific integrated circuits (ASIC), one or more microprocessors (DSP), or one or more field programmable gate arrays (FPGA).

The memory 134 may be a memory, or may be a general term of a plurality of storage elements.

The foregoing descriptions are merely specific implementations of the present invention, and are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method, the method comprising:
receiving, by a terminal, information broadcast by a base station, wherein the base station supports connectivity to a core network of a first communications standard and a core network of a second communications standard, wherein the information comprises a first area identity and a second area identity, wherein the first area identity is used to identify an area used for location management for a terminal in the first communications standard, wherein the second area identity is used to identify an area used for location management for a terminal in the second communications standard, and wherein a format of the first area identity is different from a format of the second area identity;

when the terminal enters a cell served by the base station from a cell of the second communications standard, and when the second area identity does not belong to a current area list of the terminal, initiating, by the terminal, an area update to a core network of the second communications standard, wherein the current area list is allocated by the core network of the second communications standard before the terminal enters the cell served by the base station; and sending, by the terminal, a first indication information element to the base station, wherein the first indication information element is used to indicate that the area update initiated by the terminal is initiated to the core network of the second communications standard.

2. The method according to claim 1, wherein when the terminal enters the cell served by the base station from the cell of the second communications standard, the method further comprises:

initiating, by the terminal, an area update to the core network of the first communications standard.

3. The method according to claim 2, wherein the method further comprises:

sending, by the terminal, a second indication information element to the base station, wherein the second indication information element is used to indicate that the area update initiated by the terminal is initiated to the core network of the first communications standard.

4. A communication method, the method comprising:

broadcasting, by a base station, a first area identity and a second area identity, wherein the base station supports connectivity to a core network of a first communications standard and a core network of a second communications standard, wherein the first area identity is used to identify an area used for location management for a terminal in the first communications standard, and wherein the second area identity is used to identify an area used for location management for a terminal in the second communications standard, and a format of the first area identity is different from a format of the second area identity;

when a terminal enters a cell served by the base station from a cell of the second communications standard and when the second area identity does not belong to a current area list of the terminal, receiving, by the base station, a first area update request from the terminal, wherein the current area list is allocated by the core network of the second communications standard before the terminal enters the cell served by the base station;

sending, by the base station, the first area update request to the core network of the second communications standard; and receiving, by the base station, a first indication information element from the terminal, wherein the first indication information element is used to indicate that the first area update initiated by the terminal is initiated to the core network of the second communications standard; and wherein the sending, by the base station, the first area update request to the core network of the second communications standard comprises:

sending, by the base station, the first area update request to the core network of the second communications standard according to the first indication information element.

5. A communications device, applied to a terminal and comprising at least one processor and a memory coupled to the at least one processor and storing instructions for execution by the at least one processor, the instructions instructing the at least one processor to:

receive information broadcast by a base station, wherein the base station supports connectivity to a core network of a first communications standard and a core network of a second communications standard, wherein the information comprises a first area identity and a second area identity, wherein the first area identity is used to identify an area used for location management for a terminal in the first communications standard, wherein the second area identity is used to identify an area used for location management for a terminal in the second communications standard, and wherein a format of the first area identity is different from a format of the second area identity;

initiate, when the terminal enters a cell served by the base station from a cell of the second communications standard and when the second area identity does not belong to a current area list of the terminal, an area update to the core network of the second communications standard; and send a first indication information element to the base station, wherein the first indication information element is used to indicate that the area update is initiated to the core network of the second communications standard.

6. The device according to claim 5, wherein, when the terminal enters the cell served by the base station from the cell of the second communications standard, the instructions further instruct the at least one processor to initiate an area update to the core network of the first communications standard.

7. The device according to claim 6, wherein the instructions further instruct the at least one processor to send a second indication information element to the base station, wherein the second indication information element is used to indicate that the area update is initiated to the core network of the first communications standard.

8. A communications device, applied to a base station and comprising at least one processor and a memory coupled to the at least one processor and storing instructions for execution by the at least one processor, the instructions instructing the at least one processor to:

broadcast a first area identity and a second area identity, wherein the base station supports connectivity to a core network of a first communications standard and a core network of a second communications standard, wherein the first area identity is used to identify an area used for location management for a terminal in the first communications standard, wherein the second area identity is used to identify an area used for location management for a terminal in the second communications standard, and wherein a format of the first area identity is different from a format of the second area identity;

receive, when a terminal enters a cell served by the base station from a cell of the second communications standard and when the second area identity does not belong to a current area list of the terminal, a first area update request from the terminal, wherein the current area list is allocated by the core network of the second communications standard before the terminal enters the cell served by the base station;

send the first area update request to the core network of the second communications standard; and receive a first indication information element from the terminal, wherein the first indication information element is used to indicate that the area update is initiated to the core network of the second communications standard.

9. A non-transitory computer readable storage medium, wherein the non-transitory computer readable storage medium stores a program, and wherein the program, when executed by at least one processor, instructs the at least one processor to perform:

receiving information broadcast by a base station, wherein the base station supports connectivity to a core network of a first communications standard and a core network of a second communications standard, wherein the information comprises a first area identity and a second area identity, wherein the first area identity is used to identify an area used for location management for a terminal in the first communications standard, wherein the second area identity is used to identify an area used for location management for a terminal in the second communications standard, and wherein a format of the first area identity is different from a format of the second area identity;

initiating, when a terminal enters a cell served by the base station from a cell of the second communications standard and when the second area identity does not belong to a current area list of the terminal, an area update to the core network of the second communications standard, wherein the current area list is allocated by the core network of the second communications standard before the terminal enters the cell served by the base station; and sending a first indication information element to the base station, wherein the first indication information element is used to indicate that the area update initiated by the terminal is initiated to the core network of the second communications standard.

\* \* \* \* \*